United States Patent [19]

Pralle et al.

[11] Patent Number: 4,596,362

[45] Date of Patent: Jun. 24, 1986

[54] WATER JET DRIVEN ROTARY SPRINKLER

[76] Inventors: William F. Pralle; George Spector, both of 233 Broadway RM 3615, New York, N.Y. 10007

[21] Appl. No.: 668,828

[22] Filed: Nov. 6, 1984

[51] Int. Cl.[4] .................. B05B 3/08; B05B 15/08; F16L 27/00

[52] U.S. Cl. .................. 239/233; 239/505; 239/587; 285/185

[58] Field of Search .............. 239/231, 233, 251, 253, 239/513, 515, 587, 521, 261, 505; 285/184, 185

[56] References Cited

U.S. PATENT DOCUMENTS

| | | | |
|---|---|---|---|
| 172,024 | 1/1876 | Hug | 239/231 |
| 1,287,272 | 12/1918 | Fisher | 239/515 X |
| 1,581,146 | 4/1926 | Voelker | 285/185 |
| 1,730,348 | 10/1929 | Anstiss | 239/587 |
| 1,977,882 | 10/1934 | Lassen | 239/253 X |
| 2,051,382 | 8/1936 | King | 239/587 X |
| 2,314,702 | 3/1943 | Higgins | 239/233 |
| 2,554,514 | 5/1951 | Wright et al. | 285/185 X |
| 2,983,452 | 5/1961 | Lindbloom | 239/231 X |
| 3,106,347 | 10/1963 | Hayes | 239/515 X |

FOREIGN PATENT DOCUMENTS

| | | | |
|---|---|---|---|
| 137028 | 4/1950 | Australia | 239/233 |
| 162386 | 4/1921 | United Kingdom | 285/185 |

*Primary Examiner*—Joseph F. Peters, Jr.
*Assistant Examiner*—Mary Beth O. Jones

[57] ABSTRACT

A lawn sprinkler for a garden hose is provided and consists of a pair of oppositely extending tubular arms rotatable with respect to a tubular base member, a pair of nozzles each mounted on an arm, a device for adjusting the position of each nozzle with respect to each arm and a pair of water deflectors. Each water deflector is adjustable with respect to each nozzle to receive a jet of water obliquely for purpose of giving motion to each arm and directing the jet of water in any desired direction.

4 Claims, 6 Drawing Figures

WATER JET DRIVEN ROTARY SPRINKLER

BACKGROUND OF THE INVENTION

The instant invention relates generally to outdoor watering devices and more specifically it relates to a lawn sprinkler for a garden hose.

Numerous outdoor watering devices have been provided in prior art that are adapted to spray water through rotating nozzles. For example U.S. Pat. Nos. 172,024; 270,664 and 1,558,355 all are illustrative of such prior art. While these units may be suitable for the particular purpose to which they address, they would not be as suitable for the purposes of the present invention as heretofore described.

SUMMARY OF THE INVENTION

A principle object of the present invention is to provide a lawn sprinkler for a garden hose that has a pair of adjustable water deflectors, each receiving a jet of water obliquely from a nozzle for the purpose of giving motion to each arm and directing the jet of water in any desired direction.

Anotherobject is to provide a lawn sprinkler for a garden hose that has a device to adjust each nozzle in any desired position and lock it thereto for changing the angular travel of the jet of water.

An additional object is to provide a lawn sprinkler for a garden hose that has a device to turn each nozzle vertically or horizontally to the axis of each arm in any desired position and lock it thereto for changing the angular travel of the jet of water.

A further object is to provide a lawn sprinkler for a garden hose that is simple and easy to use.

A still further object is to provide a lawn sprinkler for a garden hose that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
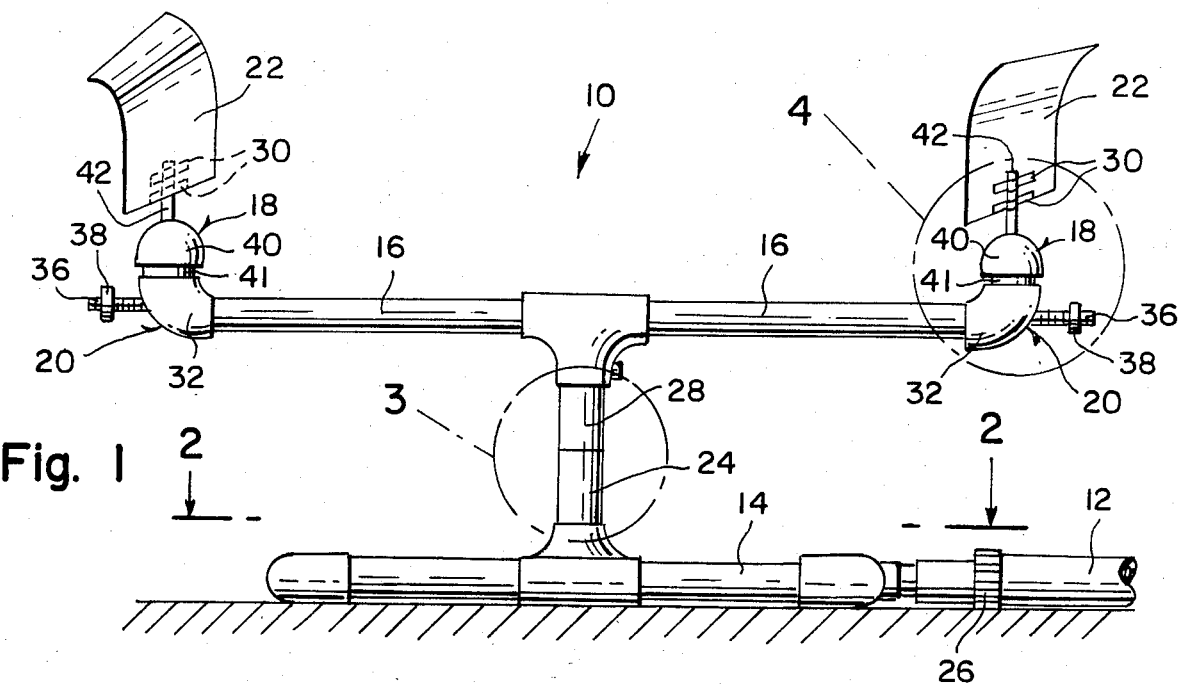
FIG. 1 is a side view of the invention in position for rotation.
Figure 2:
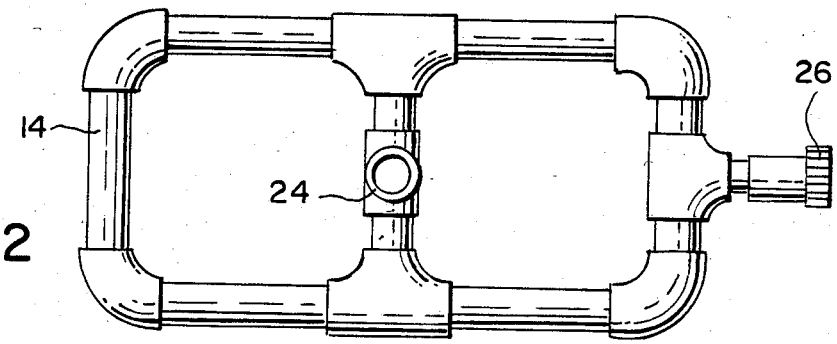
FIG. 2 is a top view of the tubular base member taken along line 2—2 in FIG. 1.
Figure 3:
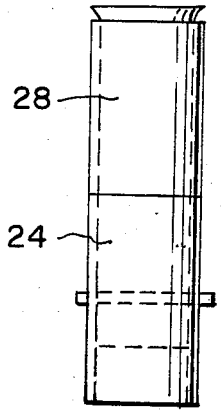
FIG. 3 is a detail view of the tubular legs shown indicated by 3 in FIG. 1.

Turning now descriptively to the drawings, in which similar reference characters denote similar elements throughout the several views, FIGS. 1 through 4 illustrates a lawn sprinkler 10 for a garden hose 12. The sprinkler 10 consists of a tubular base member 14, a pair of oppositely extending tubular arms 16, 16, a pair of nozzles 18, 18, a device 20 for adjusting the position of each nozzle 18 with respect to each arm 16 and a pair fo water deflectors 22, 22.

The base member 18 has an upwardly extending central tubular leg 24 and a hose connector 26 at one end for supplying pressurized water from the garden hose 12 through the base member 18. The arms 16, 16 have a downwardly extending central tubular leg 28 mounted on the upwardly extending central tubular leg 24 of the base member 14 so that the arms 16, 16 are rotatable with respect to the base member. Each nozzle 18 is mounted on each arm 16 while each water deflector 22 is mounted on each nozzle 18 at clamps 30. Each water deflector 22 is adjustable with respect to each nozzle 18 to receive a jet of water (not shown) obliquely for purpose of giving motion to each arm 16 and directing the jet of water in any desired direction.

Figures 4, 5, 6:
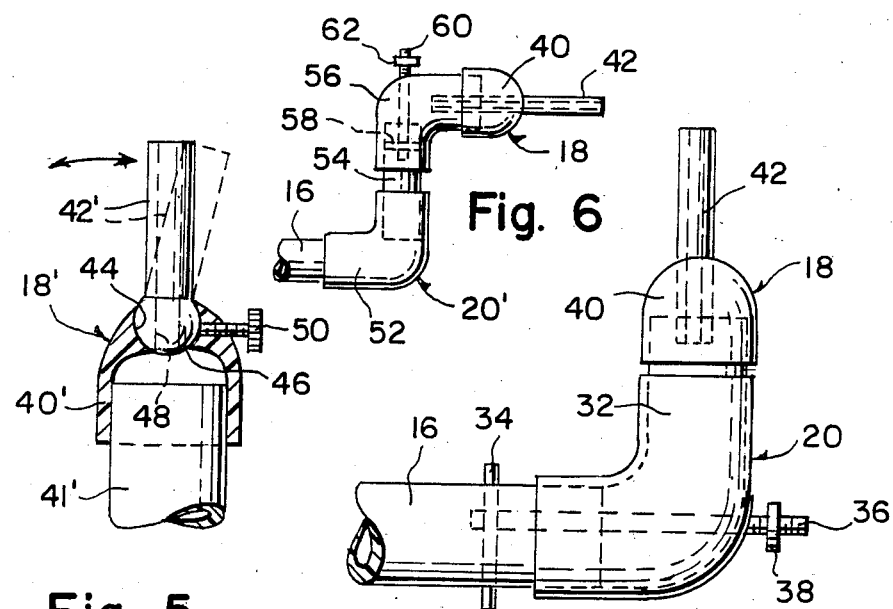
FIG. 4 is a detail view of one of the nozzles and adjustment devices shown indicated by 4 in FIG. 1.
FIG. 5 is a detail view with parts broken away of a first modification whereby the nozzle is adjustable.
FIG. 6 is a detail view of a section modification showing another type of adjustable nozzle.

The device 20 as best seen in FIG. 4, consists of a 90° elbow fitting 32, a pin 34, an elongated threaded shaft 36 and a nut 38. The elbow fitting 32 is rotatably attached to end of the arm 16. The pin 34 is mounted transversely within the end of the arm 16 adjacent the elbow fitting 32. The shaft 36 has one end held captive to the pin 34 with other end extending outwardly from the end of the arm 16 and through side of the elbow fitting 32. The nut 38 is threadably mounted to free end of the threaded shaft 36 so that the elbow fitting 32 can be turned vertically to axis of the arm 16 in any desired position and locked thereto by the nut. Each nozzle 18 consists of a cap 40 attached to one side of the elbow fitting 32 via small pipe 41 and a tube 42 attached to the cap.

FIG. 5 shows a modified nozzle 18' wherein the cap 40' has a circular socket 44 therein. A ball 46 that has a passage 48 therethrough is formed at one end of the tube 42'. The ball 46 mates with the socket 44 in the cap 40' so that the tube 42' can be positioned at any angle with respect to the cap 40'. A set screw 50 is adjustably mounted transversely through the cap 40' adjacent the ball 46 of the tube 42' so that the tube can be locked in any desired position.

FIG. 6 shows a modified device 20' for adjusting the position of one of the nozzles 18 with respect to the arm 16. The device 20' consists of a first 90° elbow fitting 52, a pipe 54, a second 90° elbow fitting 56, a pin 58, an elongated threaded shaft 60 and a nut 62. The first elbow fitting 52 is attached to end of the arm 16 with the pipe 54 attached to the first elbow fitting. The second elbow fitting 56 is rotatably attached to end of the pipe 54. The pin 58 is mounted transversely within the end of the pipe 54 adjacent the second elbow fitting 56. The shaft 60 has one end held captive to the pin 54 with other end extending outwardly from the end of the pipe 54 and through side of the second elbow fitting 56. The nut 62 is threadably mounted to free end of the threaded shaft 60 so that the second elbow fitting 56 can be turned horizontally to axis of the arm 16 in any desired position and locked thereto by the nut.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A lawn sprinkler for a garden hose which comprises:
   (a) a tubular base member having an upwardly extending central tubular leg and a hose connector at one end for supplying pressurized water from said garden hose through said base member;
   (b) a pair of oppositely extending tubular arms having a downwardly extending central tubular leg, said downwardly extending central tubular leg mounted on said upwardly extending central tubular leg of said base member so that said arms are rotatable with respect to said base member;
   (c) a pair of nozzles with orifices, each said nozzle mounted adjustably on each said arm and including means mounted adjustably in each said orifice whereby the water from the orifice can be variably directed relative to said nozzle;
   (d) water deflector mounted on said means mounted in each said orifice whereby water issuing from said means mounted in each said orifice will strike said deflectors to move said arms rotatably and deflect the water in a predetermined path, and
   (e) means for adjusting the position of each said nozzle with respect to each said arm.

2. A lawn sprinkler for a garden hose as recited in claim 1, wherein the means for adjusting each said nozzle with respect to each said arm comprises:
   (a) a 90° elbow fitting rotatably attached to end of said arm;
   (b) a pin mounted transversely within said end of said arm adjacent said elbow fitting;
   (c) an elongated threaded shaft having one end held captive to said pin with other end extending outwardly from said end of said arm and through side of said elbow fitting; and
   (d) a nut threadably mounted to free end of said threaded shaft so that said elbow fitting can be turned vertically to axis of said arm in any desired position and locked thereto by said nut.

3. A lawn sprinkler for a garden hose as recited in claim 1, wherein said means mounted in each said orifice comprises:
   (a) a cap having a circular socket therein;
   (b) a ball having a passage therethrough, said ball formed at one end of said ball mates with said socket in said cap so that said tubes can be positioned at any angle with respect to said cap; and
   (c) a set screw adjustably mounted transversely through said cap adjacent said ball of said tube so that said tube can be locked in any desired position.

4. A lawn sprinkler for a garden hose as recited in claim 1, wherein the means for adjusting the position of each said nozzle with respect to each said arm comprises:
   (a) a first 90° elbow fitting attached to end of said arm;
   (b) a pipe attached to said first elbow fitting;
   (c) a second 90° elbow fitting rotatably attached to end of said pipe;
   (d) a pin mounted transversely within said end of said pipe adjacent said second elbow fitting;
   (e) an elongated threaded shaft having one end held captive to said pin with other end extending outwardly from said end of said pipe and through side of said second elbow fitting; and
   (f) a nut threadably mounted to free end of said threaded shaft so that said second elbow fitting can be turned hoiizontally to axis of said arm in any desired position and locked thereto by said nut.

* * * * *